Dec. 28, 1937.  D. H. MONTGOMERY  2,103,912
BEARING
Filed Sept. 22, 1936
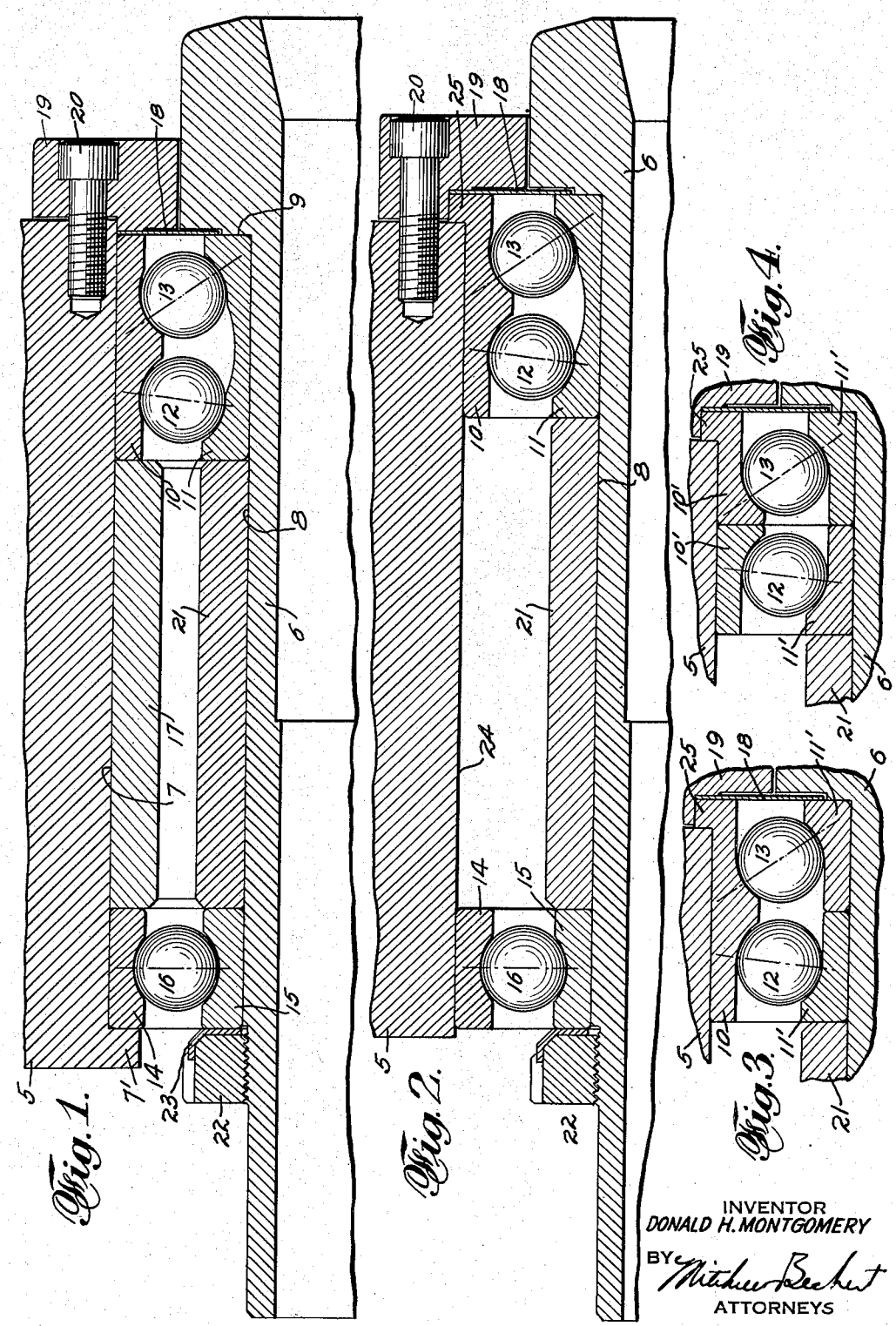
INVENTOR
DONALD H. MONTGOMERY
BY
ATTORNEYS Patented Dec. 28, 1937

2,103,912

UNITED STATES PATENT OFFICE 2,103,912

BEARING

Donald H. Montgomery, West Hartford, Conn., assignor to The New Britain Machine Company, New Britain, Conn., a corporation of Connecticut Application September 22, 1936, Serial No. 101,935

7 Claims. (Cl. 308—233)

My invention relates to an anti-friction bearing and spindle mounting.

Spindles for machine tools and the like have heretofore been mounted on preloaded ball bearings. Such preloaded ball bearings have sometimes taken the form of duplex bearings comprising a pair of single row bearings mounted in edge to edge relation and of such relative lengths that when the edge faces of the inner and outer rings are forced into contact with each other the bearing would be preloaded. Other methods of mounting both single and double row bearings and of preloading are well known in the art. In all the duplex bearings and double row preloaded bearings, with which I am familiar, the two rows of anti-friction bearing members are equally stressed; that is to say, the angle of contact of the two rows of bearing elements is the same and both rows of elements are equally stressed under preloads. However, when in addition to the preloading the active load on the spindle is applied, one of the rows of bearing elements is stressed much more than the other row; in fact, one row tends to become unloaded while the other row is loaded to a still greater extent. The more heavily loaded row of the bearing takes all of the axial or thrust load and more than its share of the radial load.

It is one of the objects of my invention to provide an improved form of double row angular contact bearing, so arranged that one row of bearing elements takes all of the thrust load in one direction and when the spindle or other rotating member is under active load the radial load is distributed more equally than heretofore between the two rows of bearing elements.

Another object is to provide an inherently preloaded double row of angular contact bearing in which when the bearing is under normal active load the radial load is more equitably distributed between the two rows of bearing elements, even though one row of bearing elements takes all of the axial or thrust load.

It is another object to provide an improved bearing to give maximum stability to a spindle or the like, both radially and axially.

It is a further object to provide an improved form of spindle mounting.

A more specific object is to provide a spindle mounting wherein the bearings may be very simply mounted in a straight through bore in the support, such as a spindle carrier for a machine tool.

Other objects and various features of invention will be hereinafter pointed out or will become apparent to those skilled in the art.

In the drawing which shows, for illustrative purposes only, preferred forms of the invention—

Fig. 1 is a fragmentary sectional view of a spindle mounting illustrating features of the invention;

Fig. 2 is a view similar to Fig. 1 but illustrating a modified form of forward bearing;

Fig. 3 is a similar fragmentary view illustrating still another modified type of forward bearing;

Fig. 4 is a view similar to Fig. 3, illustrating still another form of forward bearing.

The invention will be described as embodied in a machine tool spindle mounting. It is to be understood, however, that the invention is of broader application and may be otherwise employed.

In said drawing, 5 indicates a fragment of a support which may be the spindle carrier of a multiple spindle machine, while 6 indicates a spindle to be rotatably supported therein. The spindle is mounted on a bearing or bearings forming part of my invention to be described.

In the form shown in Fig. 1, the support 5 is provided with a long counterbore 7 extending from the front of the support 5 and leaving an inturned flange or lip 7' at the rear. The spindle 6 is turned down to the diameter 8 to a point at the forward or nose end thereof and a substantial shoulder or abutment 9 defines the end of the diameter 8. The forward end of the spindle is mounted upon an inherently preloaded double row angular contact ball bearing which comprises an outer bearing ring 10 tightly fitting in the counterbore 7 and an inner ring 11 tightly fitting the spindle diameter 8. The outer and inner rings 10—11 are provided with pairs of spaced apart opposed angular contact raceways for two rows of balls 12—13, as will be understood. The angles of contact of the rows 12—13 are indicated by dot-dash lines. It may be here stated that my invention is not concerned with the method of assembling the balls with the rings since such methods are known in the art and may involve the use of filler slots or the heating of the outer ring or cooling of the inner ring, or all of these. The extent of preload of the bearing is determined by the size of the ball used.

The spindle at the rear of the spindle carrier or support 5 is supported by a second anti-friction bearing, preferably a radial ball bearing, and includes an outer bearing ring 14, and an inner bearing ring 15 with interposed balls 16. The outer ring is located by the inturned lip or flange 7' at the bottom of the counter bore 7, and a spacer sleeve 17 is interposed between the outer ring 14 and the outer ring 10 of the forward bearing. A seal plate 18 and securing ring 19 held to the spindle carrier as by means of screws 20 serve to hold the bearings and spindle carrier in assembled relation. A second spacer sleeve 21 is interposed between the inner ring 15 of the radial bearing and the inner ring 11 of the double row angular contact forward bearing, and the bearing parts are held on the spindle by means of a nut 22 threaded onto the spindle and held as by means of a lock washer 23, all as will be understood. The spacers 17—21 in the form illustrated are of such lengths that the rear bearing 16 will not be preloaded; that is to say, the spacers will not cause any angularity of contact between the balls 16 and their respective races and the rear bearing is therefore designed to take only a radial load.

It will be seen that the forward double row angular contact bearing is designed so that the angle of contact of the row 13 is very much greater than the angle of contact of the row 12; in fact, the angle of contact of the row 12 is only sufficiently great to insure the proper preloading of the row 13. It will be clear, therefore, that the bearings will take a very slight thrust in the right hand direction, the row of balls 12 being arranged so as to take only the very slight thrusts incidental to stock feeding, chucking, clutching, etc., which may impose some thrusts toward the right on the spindle. The row of balls 13 and its races are, however, arranged to take the maximum axial thrust toward the left to which the spindle may be subjected. It will be seen that, with a very sharp angle of contact in the row 13 and the bearing preloaded, there will be substantially no spindle movement toward the left when the axial or thrust live load is put on the spindle, and, furthermore, since there is such minute movement of the spindle toward the left under live load, and since there is such a small angle of contact in the row of balls 12, the latter will be only very slightly unloaded and will continue to carry its full share of the radial load. In fact, it will be observed that when the double row bearing is inherently preloaded, the stress on the row of balls 12 with its very slight angle of contact will be greater than the stress on the balls of row 13 and when the spindle is under its operating or live load, the stress on the balls of row 13 will be increased substantially and the stress on the row of balls 12, which under normal preload was greater than that on the row 13, will be decreased and the bearing may be so designed that under live load the stresses on the rows of balls 12—13 may be substantially equalized. Equalizing of the stresses on the two rows of balls and the requirement that both rows assume their proper role in supporting the spindle both radially and axially is of great importance. With the arrangement illustrated, it will be seen that the rear row of balls 12 is for the sole purpose of supporting the spindle radially when the latter is under live load and the row 13 is for the primary purpose of supporting the spindle axially, though of course the row 13 serves also to afford radial stability to the spindle.

In the form shown in Fig. 2, the principles are the same as those heretofore described. The construction is slightly different. The same reference characters in general apply to Fig. 2 as have been applied to Fig. 1. As shown in Fig. 2, the support or spindle carrier 5 is provided with a straight through bore 24; that is to say, there is no necessity for a counterbore and inturned flange or lip 7' as illustrated in Fig. 1. The forward bearing may be precisely the same as that shown in Fig. 1, but the outer ring instead of fitting completely within the bore of the spindle carrier extends outwardly beyond the end and is provided with a radially extending flange 25 which abuts the forward face of the spindle carrier. The seal plate 18, securing ring 19, and screws 20 serve to abut the front face of the bearing ring or flange 25 and thus securely hold the outer ring 10 in the bore against movement in both axial directions. The rear of the spindle is supported by the same type of radial bearing disclosed in Fig. 1 and the same type of inner sleeve 21 and nut 22 may be employed. However, in the form shown in Fig. 2, it will be seen that the rear bearing floats in the bore of the spindle carrier and thus may be caused to take care of expansion due to heating.

In the form shown in Fig. 3, all parts may be substantially the same as shown in Fig. 2, except that the inner ring of the forward or double row bearing is formed in two parts, designated 11'—11'. The two parts 11'—11' are of such lengths that when they are caused to contact each other by forcing up the spacer sleeve 21, the rows of balls 12—13 will be preloaded to the extent and for the purpose heretofore described.

In the form shown in Fig. 4, all parts may be the same as disclosed in Fig. 3, except that here the outer ring also of the double row bearing is formed in two parts designated 10'—10', and since the bearings are arranged back to back no outer sleeve is required, even though both inner and outer rings are formed in two parts and constitute a duplex bearing which is preloaded by forcing up the sleeve 21. As illustrated in Fig. 4, the bearing is what is generally known as a duplex bearing, the bearings being in so-called back to back relationship. It is to be noted that the double row bearings of Figs. 3, 2 and 1 may also be said to be in the same general relationship. It is to be understood, however, that my invention is applicable to other arrangements; for example, the bearings may be arranged in face to face relationship. However, in the face to face relationship of the bearings the axial load would be taken by the rear row 12 of balls and the radial load by the front row 13. The principles of the invention are also, but to a lesser extent, applicable to the tandem arrangement of bearings in a duplex bearing. In the tandem arrangement with equal angles of contact, both rows of balls take nearly equal stresses under load, but to the extent that they do not take equal stresses, difference in angularity of contact between the two rows may be availed of to secure substantially equal stresses in both rows.

It will be seen that I have provided a novel and highly improved form of bearing which will provide for the maximum radial and axial stability of a spindle or the like and this without overstressing the bearing members of either row of balls in a double row bearing. Therefore, the bearing will be long lived and the spindle will turn more freely under live load than with any other form of bearing, with which I am familiar, providing for an equal degree of axial and radial stability.

While the invention has been described in considerable detail and various forms shown, it is to be understood that various modifications and changes may be made within the scope of the invention as defined in the appended claims.

I claim:

1. An inherently preloaded double row angular contact ball bearing, the angle of contact of the row to take maximum thrust being substantially greater than the angle of contact of the other row.

2. A double row angular contact bearing including inner and outer bearing rings having complementary angular contact raceways for two rows of bearing balls, bearing balls between the complementary angular contact raceways, the angle of contact of the row of balls to take maximum thrust being substantially greater than the angle of contact of the other of said rows of balls, one of said bearing rings being formed in two parts.

3. A duplex bearing including a pair of single row bearings, each comprising inner and outer bearing rings with complementary angular contact raceways for bearing balls, bearing balls between said angular contact raceways, said bearing rings being of such lengths as to preload both bearings when the outer rings and the inner rings of said two single row bearings are in end to end engagement with each other, the angle of contact of the balls in the one of said single row bearings to take maximum thrust being substantially greater than the angle of contact of the other of said bearings.

4. In a preloaded anti-friction bearing, inner and outer bearing ring means having complementary pairs of spaced apart angular contact raceways for anti-friction bearing members, anti-friction bearing members interposed between said pairs of complementary spaced apart raceways so as to form a double row bearing, the angle of contact of the one of said rows of anti-friction bearing members to take maximum thrust being substantially greater than the angle of contact of the other row of anti-friction bearing members.

5. A spindle mounting including a housing, a spindle therein, an anti-friction bearing supporting said spindle in said housing and comprising an inherently preloaded double row angular contact anti-friction bearing, the angle of contact of the row of anti-friction bearing members to take maximum spindle thrust being substantially greater than the angle of contact of the other row, and another anti-friction bearing spaced from said double row bearing and supporting a part of said spindle in said housing.

6. A spindle mounting including a support having a through bore therein, an inherently preloaded double row angular contact bearing mounted in said bore at one end thereof and secured therein for supporting the forward end of a spindle, the angle of contact of the row of said bearing to take maximum thrust being substantially greater than the angle of contact of the other row of said bearing, another bearing mounted in said bore adjacent the opposite end thereof and floating therein for supporting said spindle at a point rearwardly of said double row bearing.

7. A spindle mounting including a housing, a spindle therein, a preloaded anti-friction bearing supporting said spindle in said housing and comprising inner and outer bearing ring means having complementary pairs of spaced apart angular contact raceways for anti-friction bearing members, anti-friction bearing members interposed between said pairs of complementary spaced apart raceways so as to form a double row bearing, the angle of contact of the one of said rows of anti-friction bearing members to take maximum spindle thrust being substantially greater than the angle of contact of the other row of anti-friction bearing members.

DONALD H. MONTGOMERY.